United States Patent [19]

Schofield et al.

[11] Patent Number: 5,193,029
[45] Date of Patent: Mar. 9, 1993

[54] SINGLE SENSOR ADAPTIVE DRIVE CIRCUIT FOR REARVIEW MIRROR SYSTEM

[75] Inventors: Kenneth Schofield; Richard J. Gahan, both of Holland; Kenneth L. Schierbeek, Zeeland; Mark L. Larson, Grand Haven, all of Mich.

[73] Assignee: Donnelly Corporation, Holland, Mich.

[21] Appl. No.: 794,441
[22] Filed: Nov. 19, 1991
[51] Int. Cl.⁵ .............................................. G02B 17/00
[52] U.S. Cl. .................................... 359/604; 359/265; 359/601; 250/200; 250/206
[58] Field of Search ............... 359/603, 604, 265, 270, 359/601; 250/200, 201.1, 206, 204, 205

[56] References Cited

U.S. PATENT DOCUMENTS

| | | | |
|---|---|---|---|
| 3,601,614 | 8/1971 | Platzer, Jr. | 250/209 |
| 3,665,224 | 5/1972 | Kelsey | 307/311 |
| 3,680,951 | 8/1972 | Jordan et al. | 359/606 |
| 3,811,046 | 5/1974 | Levick | 250/206 |
| 3,813,540 | 5/1974 | Albrecht | 250/206 |
| 3,862,798 | 1/1975 | Hopkins | 359/603 |
| 3,962,600 | 6/1976 | Pittman | 250/206 |
| 4,161,653 | 7/1979 | Bedini et al. | 250/215 |
| 4,200,361 | 4/1980 | Malvano et al. | 359/38 |
| 4,249,160 | 2/1981 | Chilvers | 340/33 |
| 4,266,856 | 5/1981 | Wainwright | 359/606 |
| 4,281,898 | 8/1981 | Ochiai et al. | 359/606 |
| 4,443,057 | 4/1984 | Bauer et al. | 359/606 |
| 4,512,637 | 4/1985 | Ballmer | 359/275 |
| 4,529,275 | 7/1985 | Ballmer | 359/265 |
| 4,529,873 | 7/1985 | Ballmer | 250/201 |
| 4,572,619 | 2/1986 | Reininger et al. | 359/254 |
| 4,603,946 | 8/1986 | Kato et al. | 359/38 |
| 4,623,222 | 11/1986 | Itoh et al. | 359/38 |
| 4,629,941 | 12/1986 | Ellis et al. | 250/206 |
| 4,632,509 | 12/1986 | Ohmi et al. | 359/38 |
| 4,669,825 | 6/1987 | Itoh et al. | 359/38 |
| 4,669,826 | 6/1987 | Itoh et al. | 359/604 |
| 4,671,615 | 6/1987 | Fukada et al. | 359/38 |
| 4,676,601 | 6/1987 | Itoh et al. | 359/38 |
| 4,690,508 | 9/1987 | Jacob | 359/38 |
| 4,701,022 | 10/1987 | Jacob | 359/603 |
| 4,727,290 | 2/1988 | Smith | 315/82 |
| 4,741,603 | 5/1988 | Miyagi et al. | 359/270 |
| 4,793,690 | 12/1988 | Gahan et al. | 359/604 |
| 4,820,933 | 4/1989 | Hong et al. | 307/10.1 |
| 4,838,650 | 6/1989 | Stewart et al. | 359/604 |
| 4,886,960 | 12/1989 | Molyneux et al. | 250/206 |
| 4,896,030 | 1/1990 | Miyaji | 250/206 |
| 4,916,374 | 4/1990 | Schierbeek et al. | 318/483 |
| 4,917,477 | 4/1990 | Bechtel et al. | 359/267 |
| 4,956,591 | 9/1990 | Schierbeek et al. | 318/483 |
| 4,991,054 | 2/1991 | Walters | 361/165 |

FOREIGN PATENT DOCUMENTS

| | | |
|---|---|---|
| 0426503A1 | 5/1991 | European Pat. Off. . |
| 2808260 | 8/1979 | Fed. Rep. of Germany . |
| 3041692A1 | 5/1981 | Fed. Rep. of Germany . |
| 2513198 | 3/1983 | France . |
| 57-173801 | 10/1982 | Japan . |
| 57-208530 | 12/1982 | Japan . |
| 57-208531 | 12/1982 | Japan . |
| 59-51301 | 4/1984 | Japan . |
| 59-51325 | 4/1984 | Japan . |
| 61-54942 | 4/1986 | Japan . |
| 61-56638 | 4/1986 | Japan . |
| 2029343A | 3/1980 | United Kingdom . |
| 2119087A | 11/1983 | United Kingdom . |
| 2156295A | 10/1985 | United Kingdom . |

Primary Examiner—Loha Ben
Attorney, Agent, or Firm—Price, Heneveld, Cooper, DeWitt & Litton

[57] ABSTRACT

An automatic rearview mirror system having a reflective element that is actuatable between at least two different reflective conditions by a control that discriminates between glare-causing and nonglare-causing light simultaneously sensed by a single light sensor. The control includes a processor that is more responsive to decreasing levels of light than to increasing levels of light to produce a signal that is indicative of the slow-transient characteristic of the light sensed by the single light sensor. The processor may include a very slow signal processor that is always operative and a somewhat faster-slow signal processor, which may be selectively inhibited when the mirror is fully colored, or when a differential circuit indicates that the difference between the glare and the non-glare light sensed by the light sensor exceeds a predetermined level. The differential circuit may additionally limit the differential between the glare and the nonglare lights sensed by the light sensor.

33 Claims, 3 Drawing Sheets

SINGLE SENSOR ADAPTIVE DRIVE CIRCUIT FOR REARVIEW MIRROR SYSTEM

BACKGROUND OF THE INVENTION

The present invention is directed to rearview mirror systems for a vehicle and in particular to such systems having an automatic control that activates a reflective element between different reflective conditions in response to light levels experienced by the vehicle driver. The invention is especially advantageous when the reflective element has continuously variable reflectivity.

Automatic rearview mirrors that utilize a single sensor have been long known. However, proper control of an automatic mirror is a complex task and early efforts were not satisfactory. For example, U.S. Pat. No. 3,862,798 issued to Charles Hopkins, entitled AUTOMATIC REAR VIEW MIRROR ADJUSTER, discloses an automatic rearview mirror for a vehicle including a reflective layer covered by a liquid crystal material and a control for the liquid crystal assembly. The control includes a single photocell light sensor, facing rearward of the vehicle, and a comparator for applying a voltage to the mirror whenever the voltage developed by light impinging upon the photocell exceeds the fixed reference voltage of the comparator. The control thereby renders the mirror opaque whenever the light incident on the mirror exceeds a fixed threshold.

The problem with the Hopkins mirror is that it doesn't address the problem that different driving conditions require different light thresholds for rendering the mirror opaque. This is a result of the physiological response of the driver's eyes at different levels of background light. In order to provide a more physiologically correct response to various light sources, the prior art discloses manual adjustments by the driver of the light threshold at which the mirror is rendered opaque. Such manual adjustment can be annoying to the driver and can distract from the driving task. The prior art also discloses the addition of a separate photosensor, generally forward sensing, to serve as an ambient-light sensing means. Such dual sensor designs were intended to overcome the difficulties with the use of a single rear-facing photosensor in automatic mirrors by providing automatic adjustment of the light threshold at which the mirror is rendered opaque.

Many difficulties remain with mirror controls using two light sensors. The responsive characteristics of the pair of light sensors must be carefully selected so as to closely match. This matching is presently accomplished by comparative testing of sensors and is costly because, even with hand selection, sensors are not perfectly matched, and circuit adjustments are required for proper signal balance. Sensors also change their characteristics with age, which leads to a degradation of system performance. Variations in the vehicle in which the mirror is used can also have a profound effect on two-sensor mirrors. For example, certain vehicles have a band of light-absorbing tint across the top edge of the windshield in the vicinity of the forward-facing ambient light sensor. This tint band can greatly affect the response of the mirror to ambient light levels. Additionally, changes in the vehicle in which the mirror system is installed may occur, for example, resulting from opening or closing a sunroof or a roof of a convertible sport vehicle.

SUMMARY OF THE INVENTION

The present invention provides an automatic rearview mirror system which discriminates between glare-causing and nonglare-causing light which are simultaneously sensed by a single light sensor. Such discrimination is based upon the principle that glare-causing light tends to be rapidly changing and temporal in nature, whereas nonglare-causing light tends to be relatively constant and non-changing. The present invention is embodied in an automatic rearview mirror system for a vehicle having a reflective element that is actuatable between at least two different reflective conditions and a single light sensing means for sensing light incident on the reflective element. Means are provided that are responsive to the light sensing means for producing a slow-transient indication as a function of the light incident on the reflective element and for indicating a desired reflectance level of the reflective element as a function of the slow-transient indication and the unprocessed level of light incident on the reflective element. The development of a slow-transient indication as a function of the light incident on the reflective element causes the system to be adaptive to varying driving conditions.

In one embodiment of the invention, a processing means that discriminates between glare-causing light and nonglare-causing light is provided to process the light signal, produced by the single sensing means, to produce a signal that is indicative of the slow-transient characteristic of the light sensed by the single sensing means. The processing means is more responsive to decreasing levels of light than to increasing levels of light. Because the processing means is more responsive to decreasing light levels, the processing means tends to establish the slow-transient indication at the level that exists without the presence of glare-producing light. In the presence of glare-producing light, the processing means is less responsive, in order to avoid adapting the slow-transient indication to the glare condition. In this manner, the system discriminates between glare-producing light and nonglare-producing light.

In this embodiment of the invention, the processing means may be made even more resistant against adapting to persistent glare light conditions by providing a very slow signal processor, which is always operative, to adapt the slow-transient indication to changes in light conditions. Another signal processor may be provided that responds somewhat faster to increases in light levels. The faster-slow signal processor may be selectively inhibited by the output drive signal provided to the mirror when the mirror is fully colored to a low reflectance condition. The faster-slow signal processor is inhibited to avoid adaptation of the slow-transient indication to a glare condition. When, however, the mirror is not fully colored to a low reflectance condition, the faster-slow signal processor is allowed to operate in order to process increases in the light signal at an intermediate rate in order to accommodate changes in non-glare-causing light levels. Such conditions may be brought about by, for example, a rising sun behind the vehicle or movement from a dark rural driving condition to a moderately well lighted condition of a city driving environment.

In addition, in order to avoid adapting the slow-transient indication to high levels of glare-producing light, a differential circuit may be provided to limit the differential between the glare and nonglare light sensed by the light sensing means and to inhibit the faster-slow signal processor, when this difference exceeds a predetermined differential amount. This reduces any tendency for the system to adapt the slow-transient indication faster to high levels of sensed light than to low or moderate levels of sensed light. Additionally, means may be provided to override the slow-transient indication under high sensed light conditions, such that would exist during daylight. The system may be additionally responsive to means, such as a reverse gear sensor, to force the reflective element into a high reflectance condition. Means may also be provided to avoid actuation of the reflective element when the slow-transient indication exceeds a predetermined level.

These and other objects, advantages and features of the invention will become apparent upon a review of the following specification in conjunction with the drawings.

DETAILED DESCRIPTION OF THE PREFERRED EMBODIMENT

Figure 1:
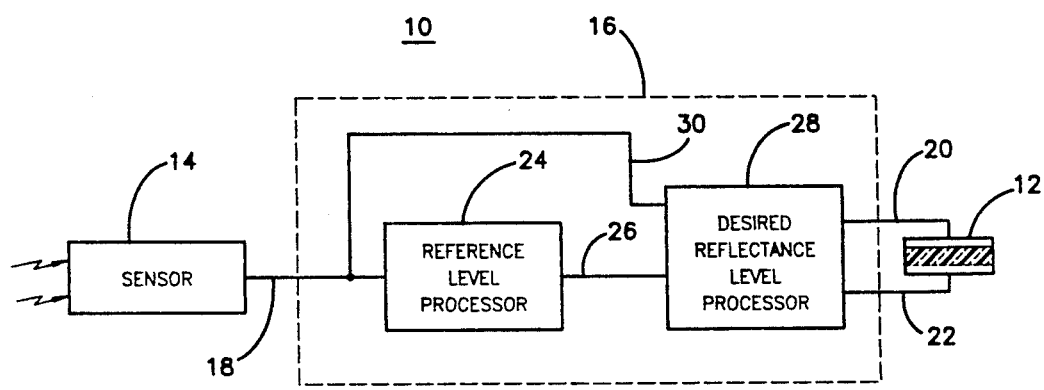
FIG. 1 is a block diagram of an automatic rearview mirror system according to the invention.

Referring now specifically to the drawings and the illustrative embodiment depicted therein, an automatic rearview mirror system 10 includes a variable-reflective element 12, a single light sensor means 14, which is adapted to sensing light incident to reflective element 12, and a processing means 16 that is responsive to the output 18 of sensing means 14 in order to produce a drive signal on lines 20 and 22 that will actuate reflective element 12 between reflectance levels (FIG. 1). Reflective element 12 is preferably an electrochromic element, such as the type disclosed in commonly assigned U.S. Pat. No. 3,280,701 issued to John F. Donnelly et. al. for an OPTICALLY VARIABLE ONE-WAY MIRROR, and U.S. Pat. No. 4,712,879 issued to Niall R. Lynam and Kiok K. Seah for an ELECTROCHROMIC MIRROR, and co-pending U.S. Pat. application Ser. Nos. 443,113 filed Nov. 29, 1989 by Desaraju V. Varaprasad, Niall R. Lynam, Hamid R. Habibi and Padma Desaraju for HIGH PERFORMANCE ELECTROCHEMICHROMIC SOLUTIONS AND DEVICES THEREOF, now U.S. Pat. No. 5,140,455, and U.S. Pat. application Ser. No. 458,969 filed Dec. 29, 1989 by Desaraju V. Varaprasad, Hamid R. Habibi, Niall R. Lynam and Padma Desaraju for a METHOD FOR REDUCING CURRENT LEAKAGE AND ENHANCING U.V. STABILITY IN ELECTROCHEMICHROMIC SOLUTIONS AND DEVICES.

Processing means 16 includes a slow-transient processor 24 which has an input connected to the output 18 of sensor 14 and which provides a signal level on input 26 to a desired reflectance level processor 28. Desired reflectance level processor 28 additionally receives a second input 30 directly from output 18 of sensing means 14. Slow-transient level processor 24 is responsive to the output of sensing means 14 in order to produce an indication to desired reflectance level processor 28 that is a function of the slow-transient characteristic of the light sensed by sensing means 14. Desired reflectance level processor 28, in turn, is responsive to the slow-transient indication on its input 26 and to the unprocessed level of light incident the mirror, at its input 30, in order to establish a desired reflectance level of reflective element 12 by producing a drive signal on its output lines 20 and 22. Thus, it is seen that the only input processed by processing means 16 is the output 18 of sensing means 14. Note that a single reflective element 12 is shown in rearview mirror system 10. However, a plurality of reflective elements, for example, an interior rearview mirror, a driver-side outside mirror and a passenger-side outside mirror, can be used, all controlled by the single processing means 16.

Figure 2:
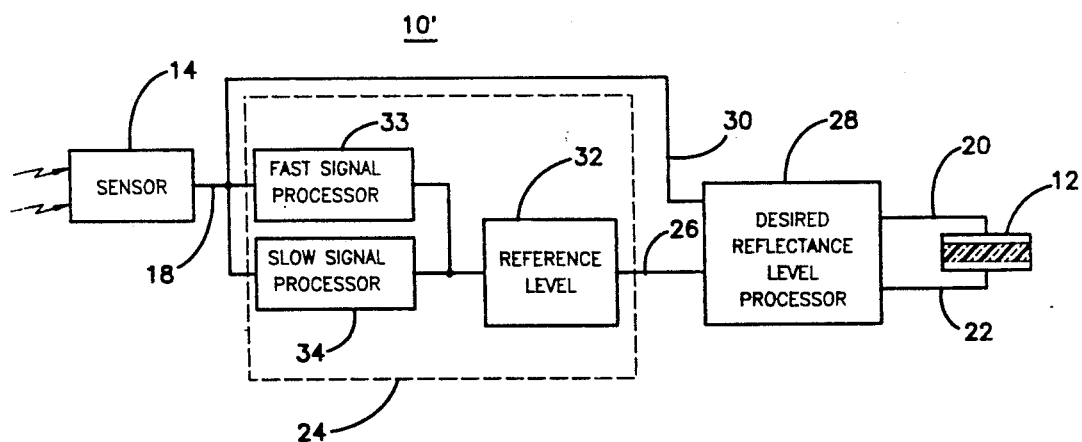
FIG. 2 is a block diagram of one embodiment of an automatic rearview mirror system according to the invention.

In one embodiment of the rearview mirror system, generally indicated at 10' (FIG. 2), slow-transient processor 24 includes a slow-transient level circuit 32, which provides a running indication of nonglaring light incident the reflective element, a fast signal processor 33 and a slow signal processor 34. Processors 33, 34 process the light level signal output 18 of sensing means 14 to the slow signal level circuit 32. Fast signal processor 33, which has a time constant of between 10 milliseconds and 1.0 second, adapts the slow-transient level on input 26, to the output of light sensing means 14, when output 18 is representative of a lower level of light sensed by sensing means 14 than the level indicated on input 26. Slow signal processor 34, which has a time constant of approximately between 2 and 8 minutes, adapts the slow-transient level indication on input 26 to the output of light sensing means 14 whenever the level of light sensed by sensor 14 is greater than the level indicated on line 26.

The nonglaring light condition is the light level that is sensed by sensor 14 when there is no glare-causing light incident to the reflective element 12. The nonglaring light condition is a slow-changing light level, which is the level that is adapted to by the human eye. The output of slow-transient level circuit 32 will rapidly be processed to the nonglaring light level by fast signal processor 33 whenever a source of glare-producing light is removed. Therefore, it is seen that rearview mirror system 10' establishes a nonglaring light indication for desired reflectance level processor 28 using the same single light sensing means as that utilized to apply to desired reflectance level processor 28 an unprocessed light signal, indicative of a glare condition. Sensing means 14 senses glare-producing light because it senses light incident to the reflective element. Such light typically is directed from the rear of the vehicle but may be from any light source located behind the plane defined by the surface of the reflective element.

Desired reflectance level processor 28, in turn, compares the unprocessed output 30 of single light sensing means 14 with the output of slow-transient level circuit 32 and, if the unprocessed light level is greater than the slow-transient level, will produce an output on lines 20 and 22 tending to color reflective element 12 to a low reflectance condition. Alternatively, if the unprocessed light level sensed by sensing means 14 is less than the level from slow-transient level circuit 32, reflectance level processor 28 will produce an output on output lines 20 and 22 which will tend to bleach reflective element 12 to a high reflectance condition.

Accordingly, whenever the level of light sensed by sensing means 14 increases, the slow signal processor 34 will slowly modify the output of slow-transient level circuit 32. This will allow the output of slow-transient level circuit 32 to gradually increase in response to increases in the sensed light level that are typical of nonglaring light level changes, as will occur, for example, during dawn conditions. Because of the 2-8 minute time constant selected for slow signal processor 34, however, abrupt decreases in the output signal level of sensing means 14, as are typically caused by glare-producing light incident to reflective element 12, will be processed only very slowly. Accordingly, the output of slow-transient level circuit 32 will not be very responsive to glare light levels. When, however, the output signal level of light sensing means 14 increases with respect to the output of slow-transient level circuit 32, fast signal processor 33 will rapidly increase the output signal level of slow-transient level circuit 32 toward the unprocessed output level of sensor 14. Because of the approximate 10 millisecond to 1.0 second time constant of fast signal processor 33, the output of slow-transient reference level circuit 32 will almost instantaneously adapt to changes in the output of sensing means 14 representing decreasing sensed light levels.

Figure 3:
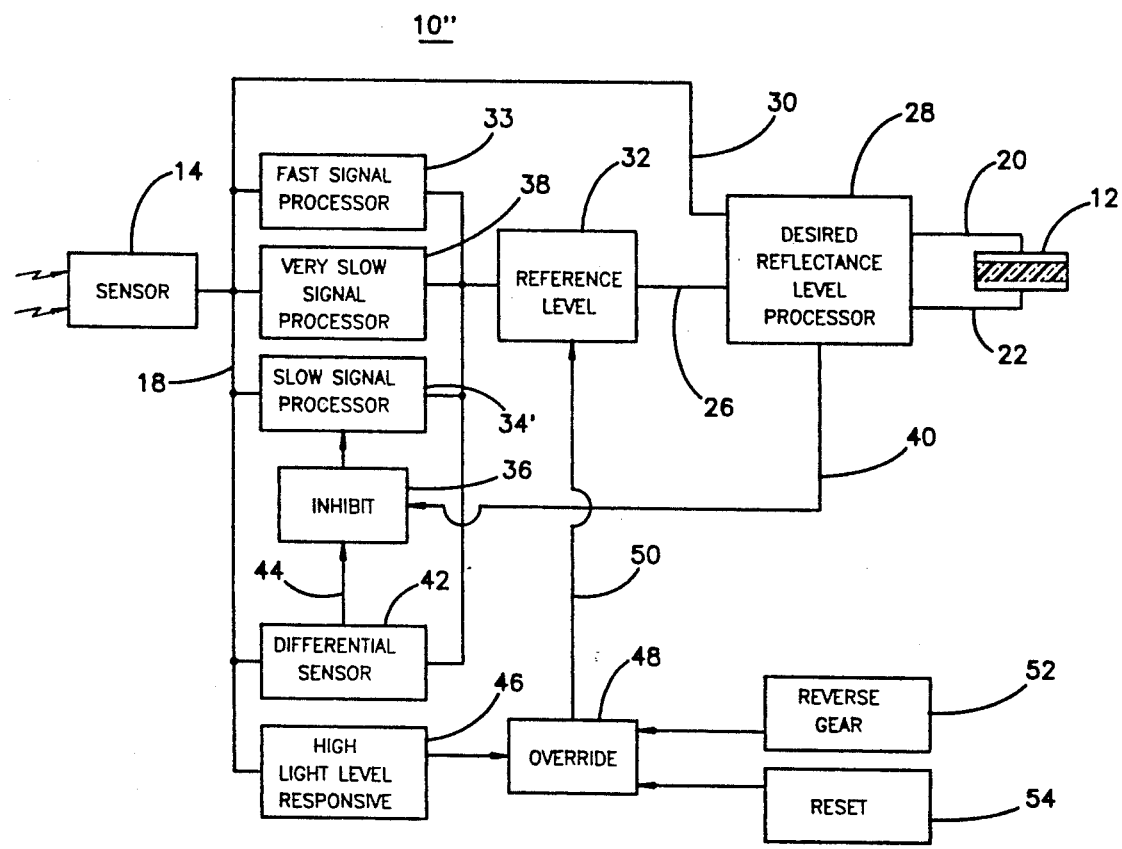
FIG. 3 is a block diagram of another embodiment of an automatic rearview mirror system according to the invention.

While rearview mirror system 10' establishes a reflectance level of reflective element 12 at an optimal level under most driving conditions, there are a few, occasionally encountered, conditions under which its performance may not be optimal. In order to accommodate these conditions, rearview mirror system 10", in addition to having a fast signal processor 33, includes a very slow signal processor 38 that is always in operation (FIG. 3). Slow signal processor 34' is selectively inhibited by an inhibiting circuit 36 so that slow signal processor 34' is only selectively in operation. Very slow processor 38 is selected to have a time constant that is, yet, longer than that of slow signal processor 34', and is on the order of approximately thirty minutes. Inhibit circuit 36 selectively inhibits slow signal processor 34' in response to a signal on a line 40, from desired reflectance level processor 28, that is produced whenever the level of signals on inputs 30 and 26 produce outputs on lines 20 and 22 indicating that reflective element 12 is fully colored to a low reflectance condition.

The purpose of the arrangement of mirror system 10" is to prevent slow-transient level circuit 32 from adapting to a persistent glare source sensed by sensor 14. Such condition would exist, for example, when a vehicle is travelling for extended periods behind the vehicle utilizing mirror system 10" with its headlights reflected in the reflective element 12. During such conditions, the increase in output from single light sensor means 14 is processed only by very slow signal processor 38 which, as indicated previously, has a time constant on the order of thirty minutes. Because of this very long time constant, very little adaption will occur. If, however, the vehicle utilizing the mirror system 10" is driven from a rural, dark condition to, for example, a parking lot that is well lighted or to a lighted city condition, the increase in output from sensing means 14 would likely not be sufficient to cause desired reflectance level processor 28 to color reflective element 12 to a fully colored low-reflectance state. Accordingly, processor 28 would not produce a signal on line 40 to inhibit slow signal processor 34'. Accordingly, slow signal processor 34' would adapt the slow-transient level produced by circuit 32 to the sensed light level at a much more rapid pace than would very slow signal processor 38. Also, upon the condition of a vehicle being driven at dark when the sun rises at dawn, the slow signal processor 34' would adequately respond to the sun rise condition. In the illustrated embodiment, slow signal processor 34' has a time constant of between approximately two and four minutes.

Mirror system 10" additionally includes a differential circuit 42 which responds to the difference in the signal level between unprocessed output 18 of light sensor means 14 and the output on line 26 of slow-transient level circuit 32. Differential circuit 42 produces an output 44 that inhibits slow signal processor 34' whenever the differential between the output of light sensing means 14 and the slow-transient indication is greater than a predetermined level. In addition to inhibiting slow signal processor 34', differential circuit 42 responds to large differences between the level of output 18 and the slow-transient level 32 by clamping this differential at a predetermined amount. In this manner, differential circuit 42 prevents the slow-transient level provided by slow-transient level circuit 32 from adapting more rapidly to large glare levels than to lesser glare levels. Automatic rearview mirror system 10" additionally includes a high light level responsive circuit 46 which responds to the absolute level of the unprocessed output of sensing means 14 by overriding the level 32, through an override circuit 48 having an output 50, whenever the absolute level of light sensed by sensing means 14 indicates that a daylight condition exists. High light level responsive circuit 46 is set to a level of approximately 100 to 300 lux and forces the output of level circuit 32 to a level that fully bleaches reflective element 12 to a high reflectance state. This feature is helpful under conditions such as exiting a garage in daylight, when the system may otherwise respond by coloring the reflective element 12 to a low reflectance condition.

Override circuit 48 may additionally be made responsive to a reverse gear switch 52 in order to force reflective element 12 to a high reflectance state whenever the vehicle is placed in reverse gear. In addition, a reset input 54 may be provided to allow the user to force the indication produced by slow-transient level circuit 32 to a high state, which will cause desired reflectance level processor 28 to force reflective element 12 to a high reflectance condition. This optional feature is provided to allow the user the option to "reset" automatic mirror system 10" during any situation under which the system does not respond favorably. Reset 54 may additionally be provided in the form of an on/off switch to remove power from the mirror system. When power is removed, the slow-transient level is automatically reset. When the mirror system is again energized, the output of sensing means 14 is rapidly processed through fast signal processor 33 to force the output of slow-transient level circuit 32 to the unprocessed light level sensed by sensor 14.

Figure 4:
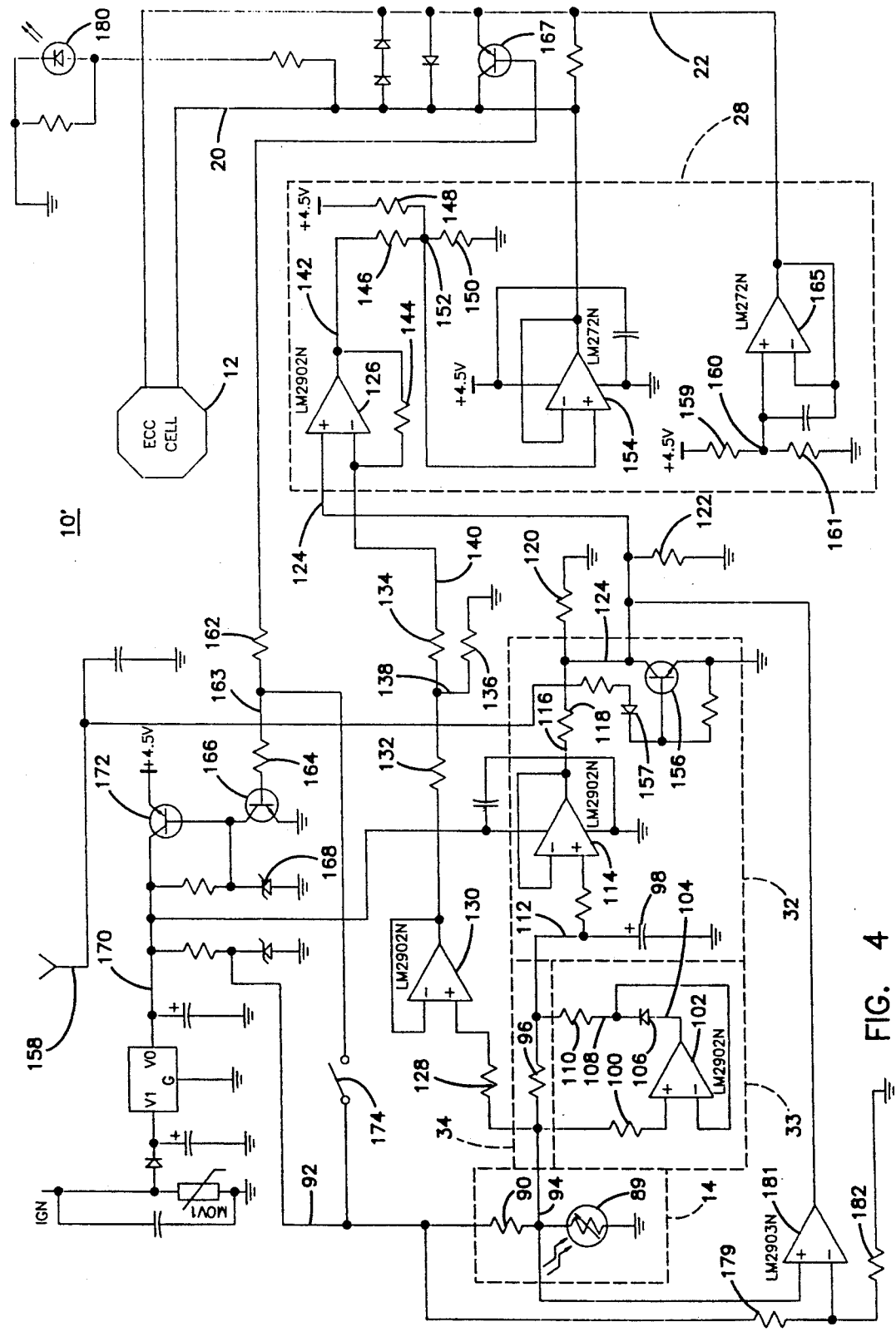
FIG. 4 is an electrical schematic diagram of the embodiment illustrated in FIG. 2.

In the embodiment of rearview mirror system 10' illustrated in detail in FIG. 4, light sensing means 14 includes a cadmium-sulfide light-responsive sensor 89 in series with a resistor 90 connected between a source of voltage 92 and signal ground. A junction 94 between resistor 90 and sensor 89 produces a signal which decreases with increasing levels of light sensed by sensor 89. The signal at junction 94 is connected with a high-impedance resistor 96 which, in turn, is connected at junction 112 with a capacitor 98 connected with signal ground. Junction 94 is additionally connected through a resistor 100 with the non-inverting input of an operational amplifier 102. An output 104 of amplifier 102 is connected through a forward-biased diode 106 to a junction 108 with a low-impedance resistor 110. Resistor 110 is, in turn, connected with junction 112 between resistor 96 and capacitor 98. Junction 108 is connected with the inverting input of amplifier 102. Junction 112 is connected to a voltage-follower, buffer-amplifier 114 whose output 116 is connected with a network comprising resistors 118, 120 and 122. A junction 124 between resistors 118, 120 and 122 is connected with the non-inverting input of a differential-input amplifier 126.

Junction 94 is also connected through a biasing resistor 128 and a voltage-follower, buffer-amplifier 130 to a voltage network including resistors 132, 134 and 136 connected together at a junction 138. Resistor 134 is, in turn, connected with the inverting input 140 of differential-input amplifier 126. An output 142 of amplifier 126 is connected with subtracting input 140 through a resistor 144 whose value, in combination with the value of resistors 132, 134 and 136, establishes the gain of differential-input amplifier 126 Output 142 is connected to a network including resistors 146, 148 and 150 which are joined together at a junction 152. Junction 152 is connected through a voltage-follower, high current amplifier 154 to output line 20 extending to reflective element 12. A voltage divider, established by a pair of resistors 159 and 161 connected in series between a voltage source and signal ground, establishes a reference voltage level at junction 160. This reference voltage is supplied to a voltage-follower, high current amplifier 165 to provide an offset voltage on output line 22.

The voltage level at junction 94, which is the output 18 of light sensing means 14, decreases with increasing light levels sensed by sensor 89. Resistor 96 performs the function of slow signal processor 34, by gradually discharging the voltage across capacitor 98 toward the level at junction 94, whenever the voltage across capacitor 98 is greater than that at junction 94. During such conditions, the non-inverting input of amplifier 102 is at a lower voltage than its inverting input, which is at the voltage level of junction 112 and, hence, at the voltage across capacitor 98. This, in turn, causes diode 106 to be reverse-biased so that there is no current through resistor 110 or amplifier 102. In such conditions, which represent an increase in light, such as would occur by a glare source appearing at the rear of the vehicle, the slow-transient level established at output 116 of buffer-amplifier 114 is adapted to the signal level at junction 94 at a slow rate established by the value of resistor 96.

When the voltage level at junction 94 increases, in response to a decreasing light level incident to reflective element 12, the increase in voltage causes the non-inverting input of amplifier 102 to be greater than its inverting input, which is at the level of output 108. This causes diode 106 to be forward-biased, causing a current to flow through amplifier 102 and resistor 110. The current through resistor 110 flows through capacitor 98 and causes the voltage at junction 112 and output 116 of buffer-amplifier 114 to increase. Because of the relatively low value of resistor 110, the slow-transient signal level at output 116 is adapted to the light level signal at junction 94 at a faster pace during such condition of relatively low light levels. While a current will continue to flow through resistor 96, even during light conditions incident the rearview mirror that are relatively low, the current is significantly less than the current through resistor 110, which will dominate. Accordingly, the voltage across capacitor 98, which is proportional to the slow-transient signal provided at output 116 of amplifier 114, is adapted to the changes in the voltage across sensor 89 at a faster pace during periods of decreasing light levels than during periods of increasing light levels.

In the illustrated embodiment, capacitor C4 is 100 $\mu$F, resistor 110 is 1 kiloohm and resistor 96 is 3.0 megohms. The time constant with which the slow-transient signal on line 116 adapts to increases in the unprocessed light sensed by signal sensor 89 during increasing light levels is, in the illustrated embodiment, between two (2) and eight (8) minutes. The time constant with which the signal on line 116 adapts to the unprocessed light level sensed by signal sensor 89 during periods of decreasing sensed light levels is between 10 milliseconds (0.01 second) and 1.0 second. In the illustrated embodiment, the time constant of fast signal processor 32, as established by resistor 110 and capacitor 98, is 100 milliseconds.

The slow-transient level on line 116 is scaled by the network consisting of resistors 118, 120 and 122 in order to provide the non-inverting input to differential-input amplifier 126. The signal level at junction 94 of light sensor 89 which is buffered by amplifier 130 and scaled by the voltage divider consisting of resistors 132 and 136, provides the subtracting input to amplifier 126. Therefore, differential-input amplifier 126 establishes output 142 as the difference between the slow-transient signal on its positive-polarity input and the unprocessed light signal on its subtracting input, multiplied by the gain established by feedback resistor 144 and resistor 134. Output 142 is positively offset by the network consisting of resistors 146, 148 and 150, buffered by amplifier 154 and applied to output line 20. The positive offset applied by resistors 146, 148 and 150 is established to be substantially equal to the offset applied to output 22 from junction 160, so that the signal across lines 20, 22 is substantially equal to that at output 142 of differential-input amplifier 126. By offsetting both signals applied to lines 20 and 22, the reflective element 12 can be driven at both positive and negative polarities by only a positive going output from differential-input amplifier 126.

Rearview mirror system 10' additionally includes a transistor 156 whose emitter-collector junction is connected between junction 124 and signal ground, and whose base is connected through a diode 157 to a reverse-inhibit input 158. Input 158 is connected to the reverse-gear switch, or the like, of a vehicle and applies a positive base drive to transistor 156 whenever the vehicle is placed in reverse gear. This causes the emitter-collector of transistor 156 to become conducting, which pulls junction 124 to signal ground. This decrease in the voltage on junction 124 is equivalent to providing a high slow-transient light signal to differential-input amplifier 126 which causes its output to decrease to its minimum level and apply a low signal level across output lines 20 and 22. This causes reflective element 12 to assume a fully-bleached condition. Thus, whenever the vehicle is placed in reverse gear, the reflective element is forced into a high reflectance mode.

Mirror system 10' additionally includes a transistor 167, whose emitter-collector junction is connected across output lines 20 and 22 and whose base is connected through a resistor 162 and 164 to the base of a transistor 166. The emitter-collector junction of transistor 166 is, in turn, connected to the base of a transistor 172 which performs the voltage regulation for mirror system 10' in cooperation with a zener diode 168 applied between the base of transistor 172 and signal ground. Junction 163, between resistors 162 and 164, is connected through a switch 174 to positive voltage source 92.

In this manner, whenever switch 174 is closed, transistor 166 conducts and the base drive is removed from transistor 172 which removes power from mirror system 10'. In addition, the emitter-collector junction of transistor 167 is caused to conduct, which shorts lines 20, 22 together and bleaches reflective element 12. The result is that switch 174 is a reset means 54 that is capable of interrupting the operation of the processing circuit of mirror system 10' and rapidly places the reflective element 12 in a high reflectance condition in response to the driver closing switch 174. When switch 174 is again opened, the voltage across capacitor 98 will rapidly increase through the fast signal processor to the level of unprocessed light then sensed by sensing means 14. Thus, for example, if the user enters a lighted parking lot at night from a dark environment the mirror system may have a tendency to darken and remain dark for several minutes. Such undesirable condition can be overridden by the user actuating reset means 54. However, such situations will likely be incurred only infrequently and may not even be noticed by the user.

A comparator 181 is provided having its non-inverting input connected with junction 94 and its inverting input connected with a constant voltage level established by a voltage divider including resistors 179 and 182 connected in series between voltage source 92 and ground. The output of comparator 181 is connected with junction 124. The purpose of comparator 181 is to monitor the magnitude of the light level sensed by sensor 89 and to force the reflectance level of element 12 to a high reflectance state whenever the sensed light exceeds a predetermined level indicative of a daytime condition.

An indicating light-emitting diode 180 is optionally connected with output line 20 in order to provide an indication of the reflectance level of reflective element 12. This feature, which is conventional in most automatic rearview mirror systems, is optional with the present system. In addition to the features and alternatives previously set forth, the present invention may include a user-operable sensitivity adjusting device (not shown) in order to vary the level at which reflective element 12 operates. Such sensitivity adjustment may be in the form of an offset adjustment to junction 124 in order to adjust the level at which the coloration of reflective element 12 begins. Alternatively, such sensitivity adjusting device could be in the form of a variable adjustment to the value of resistors 144 and 122 in order to adjust the gain of differential-input amplifier 126 and, hence, the amount of coloration of the reflective element for a given level of input light level signal.

While the present invention has been illustrated in a mirror system that is operated as an open-loop control system, its principles are equally applicable to a closed-loop control system in which the single light sensing means 14 senses light incident to the reflective element after the light has traversed the light-attenuating panel of the variable-reflective element. In such a closed-loop control, the rate of adapting to lower light levels will need to be altered in order to avoid overreacting to decreasing light levels, which will appear darker than in actuality because of the influence of the attenuation of the sensed light by the coloration of the reflective element. Such modifications are well within the skill of the artisan. Although the invention is illustrated controlling the interior mirror of a vehicle, it could be applied to the vehicle, either independently or by being slave driven from the interior mirror In addition, although the invention has been illustrated with an electrochromic reflective element, its principles may be applied to other electro-optic elements, such as liquid crystal elements, and to mechanical prismatic flip mirrors. Also, such adaptive drive circuitry can be incorporated into semiautomatic mirror systems where automatic control is combined with, for example, activation of the automobile headlamps, or to activation of a manually operated switch means. Such adaptive control circuitry can also be utilized to control non-mirror devices such as, for example, automobile sun visors, shade bands, sunroofs, and the like, capable of variable transmission under electrical control.

Changes and modifications in the specifically described embodiments can be carried out without departing from the principles of the invention, which is intended to be limited only by the scope of the appended claims, as interpreted according to the principles of patent law, including the Doctrine of Equivalents.

The embodiments of the invention in which an exclusive property or privilege is claimed are defined as follows:

1. An automatic rearview mirror system for a vehicle comprising:
    a reflective element that is actuatable between at least two different reflectance conditions;
    a single light sensing means for sensing light incident to said reflective element; and
    processing means responsive to said light sensing means for producing a slow-transient indication as a function of said light incident to said reflective element and for indicating a desired reflectance level of said reflective element as a function of said slow-transient indication and said light incident to said reflective element.

2. The mirror system in claim 1 wherein said reflective element is continuously variable within a defined range of reflectance levels.

3. The mirror system in claim 1 wherein said reflective element is electrochromic.

4. The mirror system in claim 1 wherein said light sensing means is a sensor facing rearward of said vehicle.

5. The mirror system in claim 1 wherein said processing means produces said slow-transient indication as a function of the lowest level of light sensed by said light sensing means.

6. The mirror system in claim 5 wherein said lowest light level is determined by processing decreases in light levels sensed by said sensing means at a faster rate than increases in light levels sensed by said sensing means are processed.

7. An automatic rearview mirror system for a vehicle comprising:
    a reflective element that is actuatable between at least two different reflectance conditions;
    a single light sensor that is responsive to light incident to said reflective element and adapted to produce a light signal;
    processing means responsive to said light sensor for producing a slow-transient signal as a function of said light signal; and means responsive to said light sensor and said processing means for indicating a desired reflectance level of said reflective element as a function of said slow-transient signal and an unprocessed value of said light signal.

8. The mirror system in claim 7 wherein said reflective element is continuously variable within a defined range of reflectance levels.

9. The mirror system in claim 7 wherein said reflective element is electrochromic.

10. The mirror system in claim 7 wherein said light sensor is facing rearward of said vehicle.

11. The mirror system in claim 7 wherein said processing means processes decreases in said light signal at a faster rate than said processing means processes increases in said light signal.

12. The mirror system in claim 11 wherein said processing means processes decreases in said light signal at a time constant of between approximately 0.1 and 1.0 seconds.

13. The mirror system in claim 11 wherein said processing means processes increases in said light signal at a time constant of between approximately two and eight minutes.

14. An automatic rearview mirror system for a vehicle comprising:
   a reflective element actuatable between at least two reflective conditions;
   a single rearward facing light sensor that is responsive to light incident to said reflective element for producing a light signal;
   processing means for processing said light signal to produce a slow-transient signal, wherein said processing means is more responsive to levels of said light signal indicative of lower light levels, than to levels of said light signal indicative of higher light levels; and
   desired reflectance level circuit means responsive to said light sensor and said processing means for providing an indication of a desired reflectance level for said reflective element as a function of said slow-transient signal and an unprocessed value of said light signal.

15. The mirror system in claim 14 wherein said processing means processes said levels of said light signal indicative of lower light levels to produce said slow-transient signal at a faster rate than said processing means processes said levels of said light signal indicative of higher light levels.

16. The mirror system in claim 15 wherein said processing means processes said levels of said light signal indicative of lower light levels with a fast signal processor having a time constant of between approximately 0.1 and 1.0 seconds.

17. The mirror system in claim 15 wherein said processing means processes said levels of said light signal indicative of higher light levels with a slow signal processor having a time constant of between approximately two and eight minutes.

18. The mirror system in claim 17 including means responsive to said desired reflectance level circuit means for inhibiting said slow signal processor when said indication of said desired reflectance level exceeds a predetermined level.

19. The mirror system in claim 18 wherein said processing means processes said levels of said light signal indicative of higher light levels with a very slow signal processor having a time constant of approximately thirty minutes.

20. The mirror system in claim 18 including means responsive to the difference between said light signal and said slow-transient signal for inhibiting said slow signal processor when said difference exceeds a predetermined amount.

21. The mirror system in claim 14 including means responsive to the difference between said light signal and said slow-transient signal for limiting said difference to a predetermined amount.

22. The mirror system in claim 14 including means responsive to said light signal equalling or exceeding a predetermined level for forcing said desired reflectance level signal to a maximum-reflectance state.

23. The mirror system in claim 14 including user-responsive reset means for resetting said slow-transient signal to a defined level.

24. An automatic rearview mirror system for a vehicle comprising:
   a reflective element that is actuatable between at least two reflectance conditions;
   a single light sensing means responsive to light incident to said reflective element for producing a light signal;
   processing means for processing said light signal to produce a slow-transient signal, wherein said processing means processes decreases in said light signal at a faster rate than said processing means processes increases in said light signal; and
   desired reflectance level circuit means responsive to said light sensing means and said processing means for providing an indication of a desired reflectance level for said reflective element as a function of said slow-transient signal and an unprocessed value of said light signal.

25. The mirror system in claim 24 wherein said processing means includes fast signal processing means that responds to decreases in said light signal at a time constant of between approximately 0.1 and 1.0 seconds.

26. The mirror system in claim 24 wherein said processing means includes slow signal processing means that responds to increases in said light signal at a time constant of between approximately two and eight minutes.

27. The mirror system in claim 24 wherein said processing means includes a first slow signal processing means that responds to increases in said light signal according to a first slow time constant and a second show signal processing means that responds to increases in said light signal according to a second slow time constant that is faster than said first slow time constant.

28. The mirror system in claim 27 including means responsive to said desired reflectance level circuit means for inhibiting said second slow signal processing means when said desired reflectance level is below a predetermined level.

29. The mirror, system in claim 27 wherein said first slow time constant is approximately thirty minutes and said second slow time constant is between approximately two and eight minutes.

30. The mirror system in claim 29 including user-responsive reset means for resetting said slow-transient signal to a defined level.

31. The mirror system in claim 27 including means responsive to the difference between said light signal and said slow-transient signal for inhibiting said second slow signal processing means when said difference exceeds a predetermined amount.

32. The mirror system in claim 24 including means responsive to the difference between said light signal and said slow-transient signal for limiting said difference to a predetermined amount.

33. The mirror system in claim 24 including means responsive to said light signal equalling or exceeding a predetermined level for forcing said desired reflectance level to a maximum-reflectance state.

* * * * *

UNITED STATES PATENT AND TRADEMARK OFFICE
CERTIFICATE OF CORRECTION

PATENT NO. : 5,193,029
DATED : March 9, 1993
INVENTOR(S) : Schofield et al

It is certified that error appears in the above-indentified patent and that said Letters Patent is hereby corrected as shown below:

Column 7, line 22, after "126" insert --.--.

Column 10, line 5, before "the vehicle" insert --controlling the reflectance level of the exterior mirrors of--.

Column 10, line 6, after "mirror" insert --.--.

Column 10, line 40, after "incident" delete --to--.

Column 12, line 50, show signal" should be --slow signal--.

Signed and Sealed this

Ninth Day of May, 1995

Attest:

BRUCE LEHMAN

Attesting Officer

Commissioner of Patents and Trademarks